United States Patent [19]
Kikinis

[11] Patent Number: 5,779,334
[45] Date of Patent: *Jul. 14, 1998

[54] ENHANCED VIDEO PROJECTION SYSTEM

[75] Inventor: Dan Kikinis, Saratoga, Calif.

[73] Assignee: Lextron Systems, Inc., Saratoga, Calif.

[*] Notice: The term of this patent shall not extend beyond the expiration date of Pat. No. 5,632,545.

[21] Appl. No.: 780,351

[22] Filed: Jan. 8, 1997

Related U.S. Application Data

[63] Continuation-in-part of Ser. No. 686,809, Jul. 26, 1996.
[51] Int. Cl.$^6$ .................................................. G03B 21/28
[52] U.S. Cl. .................................... 353/31; 353/84
[58] Field of Search .............................. 353/31, 33, 34, 353/84; 349/5, 7, 8, 61

[56] References Cited

U.S. PATENT DOCUMENTS

| | | | |
|---|---|---|---|
| 4,368,963 | 1/1983 | Stolor | 353/84 |
| 5,135,300 | 8/1992 | Toide et al. | 349/8 |
| 5,287,131 | 2/1994 | Lee | 353/31 |
| 5,394,204 | 2/1995 | Shigeta et al. | 353/31 |
| 5,398,086 | 3/1995 | Nakano et al. | 353/31 |
| 5,481,320 | 1/1996 | Konuma et al. | 353/31 |
| 5,632,545 | 5/1997 | Kikinis | 353/31 |

Primary Examiner—William Dowling
Attorney, Agent, or Firm—Donald R. Boys

[57] ABSTRACT

A color video projector system has separate light sources for producing separate beams of light which are passed each first through color filters to provide separate color beams before being processed by video-controlled light shutter matrices and then combined into a single beam projectable to provide a full-color video display with superimposed color spots rather then side-by-side color spots. In a preferred embodiment the color beams are red, green, and blue. In another aspect of the invention a single white-light source is used, and the beam of white light is split by a prism system into separate color beams, which are redirected to impinge as parallel beams on a monochrome LCD array. The LCD array is switched by a controller driven in accordance with a video signal, and the emerging beams are recombined and focused on a surface to produce a dynamic color image.

14 Claims, 2 Drawing Sheets

System Overview

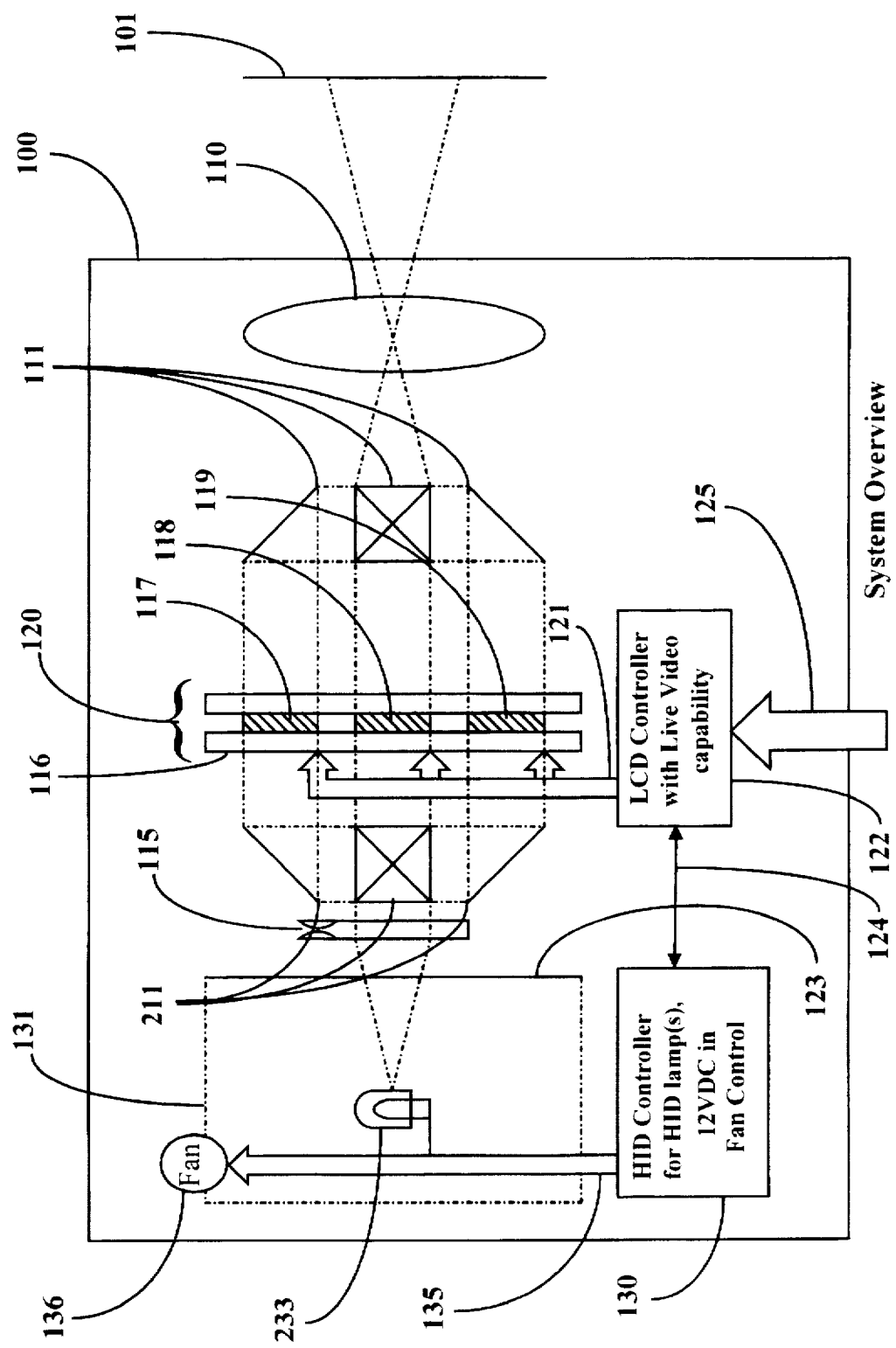

ENHANCED VIDEO PROJECTION SYSTEM

CROSS-REFERENCE TO RELATED APPLICATIONS

The present application is a continuation-in-part application of prior application 08/686,809, filed Jul. 26, 1996, which is incorporated herein in its entirety by reference.

FIELD OF THE INVENTION

The present invention is in the area of video projection display, and pertains more particularly to such displays using Liquid Crystal Displays.

BACKGROUND OF THE INVENTION

There are many different systems available for video projections. Such systems include, but are not necessarily limited to, color Liquid Crystal Display (LCD) projectors, Cathode Ray Tube (CRT) projectors, micro-mirror projectors and so forth. There are also back projection systems available, that project on the back of translucent or transparent material, and are viewed from the opposite direction, but they use generally the same technology as the systems already mentioned. In general, however, all of these display systems are rather expensive and have difficulty proving satisfactory light levels.

Less expensive units than those mentioned above have recently become available, mostly based on small active matrix color LCD's (AM-LCD's) or thin-film transistor LCD's (TFT-LCD's). These systems are a partial solution to the problems besetting projection display technology, but resolution and brightness are still limited, and cost compared to regular Television sets (TV's) is still rather high. The brightness availability is still marginal, so, in a living room, which will typically have large windows, daylight viewing may not be effective due to strong ambient light. Of course curtains can be closed, or a special windowless TV room can be built, but cost and ease of use suffer.

What is clearly needed are better projection systems and better methods, crossing traditional media boundaries.

One simple way to offer more brightness is to use brighter, better lamps. This allows more light to be projected. The problem, however, with brighter, more powerful lamps is that the lamps generate a lot of heat, requiring noisy high speed fans, and at the same time drastically reduce the useful life of LCD's used in such projection schemes by thermally loading the LCD's to the maximum allowable, and sometimes beyond. This is true partly because in a conventional color AM-LCD only 2–5% of light is transmitted when a cell is on, and near 0% when the LCD cell is off. This fact dictates that most light is converted into heat in the LCD.

SUMMARY OF THE INVENTION

In a preferred embodiment of the present invention a video projector system is provided comprising individual light sources, one each for each color to be projected, adapted to provide each a separate light beam; a lens system in the path of the separate light beams, adapted for focusing the beams; a number of individual color filters equal to the number of beams, in the colors to be projected, and placed one each in each beam path; a light-shutter matrix system comprising a number of equivalent switching matrices equal to the number of beams and placed one each in the beam paths; a video controller adapted for controlling the light-shutter matrices; and an optical combination system adapted for combining the several beams into a single composite beam for projection on a surface to provide a video display. Each beam passes through a color filter before being processed by a light-switching matrix.

In a preferred embodiment the light-shutter matrices are monochrome LCD arrays and three light sources provide three beams. Red, green, and blue filters are used to provide red, green, and blue beams to an LCD matrix system.

In various embodiments, assuming projectors of relatively equal cost, by using a triple monochrome LCD structure instead of a color AM-LCD, and pre-coloring of light, more light output can be achieved than in conventional systems. Systems according to embodiments of the invention are also less expensive than conventional color LCD systems, because the monochrome LCDs used are less expensive than color LCDs, and because alignment of components is less critical than in conventional LCD projection systems. A further advantage in quality is provided because the recombination of three video-controlled color beams allows superposition of color spots (or nibbles) in a final display.

In another embodiment of the invention a single white light beam is focused on a prism system which splits the white light beam into separate color beams, which are in turn directed as parallel beams on cells of a monochrome LCD array. The LCD array is switched by a controller following a video signal, and the emerging beams are recombined and focused on a screen to form a dynamic video image.

Video projection systems according to embodiments of the present invention are capable of providing sharper images than conventional systems with less expensive and less complicated apparatus, and with considerably less need to dispose of waste heat from light sources.

BRIEF DESCRIPTION OF THE DRAWING FIGURES

FIG. 2 is a diagrammatical representation of an enhanced video projector system according to another embodiment of the present invention.

DESCRIPTION OF THE PREFERRED EMBODIMENTS

Figure 1:
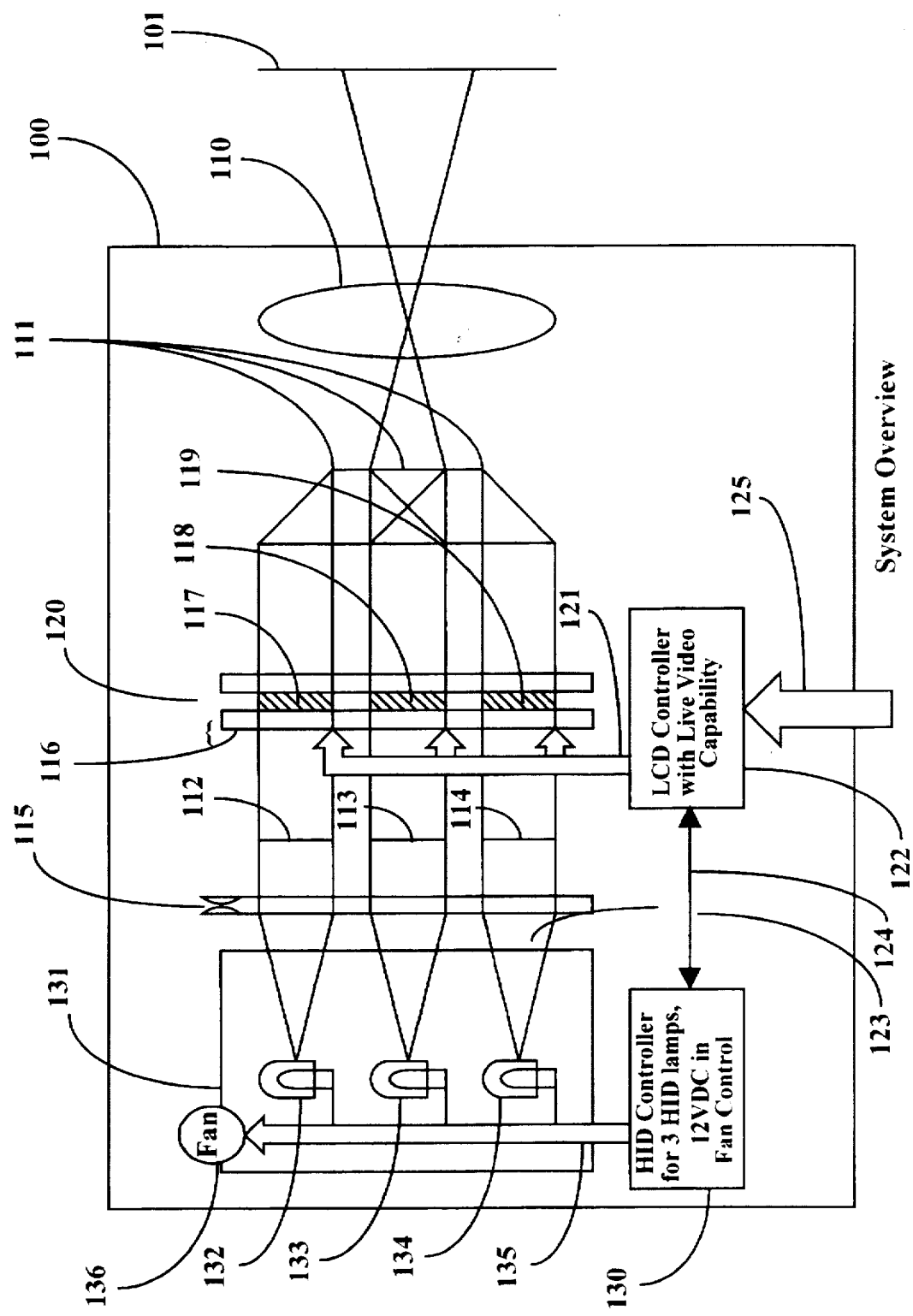
FIG. 1 is a diagrammatical representation of an enhanced video projector system according to an embodiment of the present invention.

The present invention in various embodiments differs from the prior art in that a color AM-LCD array, as described above in the Background section, is not used. When a color AM-LCD array is used in video projection systems, the light typically first has to pass through a polarization filter, then through the glass and circuitry of the LCD matrix as well as the actual chambers containing the LCD material. The light then passes through a second set of circuitry and glass, through a second polarization filter, and finally through the color filter. Since a color filter is essentially a band pass filter for light, and typically the scheme used is Red/Green/Blue (RGB), by it's very definition it must absorb most of the energy reaching it. Also, the color filter contains nibbles of each color next to each other, and must be precisely aligned when attached to the glass, in order to provide that the LCD cell and the Filter nibble match.

In embodiments of the present invention, the apparatus is arranged in a distributed manner. Light from light sources, typically lamps, is first colored and otherwise prepared into three single color beams, which then pass each through a monochrome LCD array. The three color beams are then optically recombined with a mirror and prism system in such a way that they form a single beam having light of all colors of each pixel superimposed, instead of side by side in each pixel, as is typical in the art. Superposition of the color dots in the pixels projected and displayed provides for true and brighter color.

FIG. 1 is an elevation view showing a typical implementation in a preferred embodiment of the present invention. Light for the projector is generated in this embodiment by three High Intensity Discharge (HID) lamps 132–134, which are controlled by controller 130, which also controls a fan 136 for cooling the light sources. The lamps are provided in a separate sub-unit 131, which acts as a heat containment system, exchanging the heat via fan 136 to the outside, rather than in the box. Light leaves heat containment system 131 via heat filter glass 123.

After leaving the heat containment and light source unit, the three light beams produced are focused by a condenser lens system 115, and then passed through color RGB filters 112–114. The position and order of the color filters is arbitrary, as long as one is red, one is green, and one is blue.

On the first glass of LCD unit 120, which comprises three monochrome LCD arrays 117, 118, and 119, there is an optional metal mask 116 blacking out the non-active areas of the LCD. An aluminum process can be used for the mask, similar to a process known in the art for making connections on the active matrix of the LCD.

After passing through the active regions 117–119, the separate beams get combined into a single beam by mirror and prism system 111, then the combined beam is focused and projected onto a surface 101. It will be apparent to those with skill in the art that there are a number of ways the beam combination may be done, and a number of ways lens system 110 may be fashioned and used to project the final display on a screen or wall or other surface. The projection system is useful as well for backside projection.

A video signal for the system is delivered from outside via link 125 into a controller 122. A great variety of different signal formats are known and can be implemented, both analog and digital, or any combination of several signals can be used. Controller 122 controls the three monochrome matrices 117, 118, and 119. In one embodiment the LCD unit is built from three separate pieces of glass, each containing only one monochrome set. A mounting frame is then used to align those in front of mirror and prism system 111.

In some embodiments of the invention, chip-on-glass technology is used to implement most of LCD controller 122 on glass, reducing wiring and handling issues.

In embodiments of the present invention the color filter always precedes the LCD arrays, and the filters are implemented in such a manner that each color filter covers all pixels of its own color in a contiguous manner. This feature allows more light than in the prior art, partly because monochrome LCD cells absorb much less light than do color LCD's, and also allows much cheaper manufacturing cost than prior art systems, since no precise alignment between color filter and LCD is required.

A control link 124 is provided between controllers 122 and 130, and this link is used in some embodiments for some limited variable control of light output from each of the three light sources individually.

FIG. 2 is a diagrammatical representation of another embodiment of the present invention. In the embodiment of FIG. 2 a single white-light source 233 is used, and a single beam is passed through heat filter glass 123 to condenser lens system 115. From lens system 115 the collimated white-light beam is directed to a prism system 211 where the white light is split into three beams, red, green, and blue (RGB). Mirrors 213 and 215 cooperate in directing two beams back toward monochrome LCD array 120, while the third beam is directed straight ahead into the LCD array. Since the white (or near white light) contains energy in all colors of visible light, splitting out the three colors for the LCD array results in no significant loss of light energy for each color.

After passing through monochrome LCD array 120, which in this embodiment is controlled by controller 122 just as described for the first embodiment above with referral to FIG. 1, the colors are recombined by another prism system 217 and mirrors 219 and 221. The recombined beam is then focused and directed by lens system 110 to a screen 101 to provide a dynamic color image. Compensation filters may be mounted to compensate for differences in light efficiency for the system.

It will be apparent to those with skill in the art that there are many alterations that might be made in the embodiments described without departing from the spirit and scope of the invention. For example, there are many ways to implement light shutter devices besides LCD's. There are similarly many sorts of light sources that may be used in practicing embodiments of the invention. There are many ways adequate controllers may be implemented as well. Other design differences will become apparent to those with skill in the art. The invention is limited in scope only by the claims which follow.

What is claimed is:

1. A video projector system comprising:
   a source projecting parallel beams of light of different colors;
   a light-shutter matrix system comprising a number of equivalent switching matrices equal to the number of beams and placed one each in the beam paths;
   a video controller adapted for controlling the light-shutter matrix system; and
   an optical combination system adapted for combining the separate beams after the light-shutter matrix system into a single composite beam for projection on a surface to provide a video display.

2. The system of claim 1 wherein the source projecting parallel beams of light comprises three white-light sources producing three parallel beams of white light through three color filters.

3. The system of claim 2 wherein the three color filters comprise one each of red, green, and blue filters.

4. The system of claim 1 wherein the source projecting parallel beams of light comprises a single white-light source projecting a white beam on a prism system adapted to separate the white beam into three color beams, and a redirection apparatus for directing the color beams into parallel paths to the light shutter matrix system.

5. The system of claim 4 wherein the three color beams produced by the prism system are one each of red, green, and blue beams.

6. The video projection system of claim 1 wherein the light-shutter matrix system comprises a monochrome LCD array.

7. A method for projecting a dynamic color image, comprising steps of:
   a) providing separate parallel beams of colored light;
   b) directing the separate color beams on separate cells of a monochrome LCD array;
   c) switching the monochrome matrix by action of a video signal through an LCD controller;

d) recombining the beams of colored light into a single beam; and e) focusing the recombined beam on a surface to provide a dynamic color image.

8. The method of claim 7 wherein the separate beams of colored light comprise beams of red, green and blue light.

9. A method for projecting a dynamic color image, comprising steps of:

a) directing a beam of white light on a prism system;

b) splitting the beam of white light into separate beams of colored light by action of the prism system;

c) directing the separate beams of colored light onto a monochrome LCD matrix having as many cells as the separate beams of colored light;

d) switching the monochrome matrix by action of a video signal through an LCD controller;

e) recombining the beams of colored light into a single beam; and f) focusing the recombined beam on a surface to provide a dynamic color image.

10. The method of claim 9 wherein in step b) the beam of white light is split into three color beams, one red, one green, and one blue.

11. A video projector system comprising:

a source projecting a beam of white light;

a splitter adapted to split the beam of white light into separate parallel beams of light of different colors;

a light-shutter matrix system comprising a number of equivalent switching matrices equal to the number of beams of light of different colors and placed one each in each beam path;

a video controller adapted for controlling the light-shutter matrix system; and an optical combination system adapted for combining the separate beams after the light-shutter matrix system into a single composite beam for projection on a surface to provide a video display.

12. The video projector system of claim 11 wherein the splitter divides the beam of white light into three separate beams of colored light, one red, one green, and one blue.

13. The video projector system of claim 11 wherein the splitter is an apparatus comprising prisms.

14. The video projection system of claim 11 wherein the light-shutter matrix system comprises a monochrome LCD array.

* * * * *

(12) INTER PARTES REVIEW CERTIFICATE (50th)
United States Patent
Kikinis

(10) Number: US 5,779,334 K1
(45) Certificate Issued: Dec. 17, 2014

(54) ENHANCED VIDEO PROJECTION SYSTEM

(75) Inventor: Dan Kikinis

(73) Assignee: Intellectual Ventures I LLC

Trial Number:
  IPR2013-00112 filed Jan. 15, 2013

Petitioner: Xilinx, Inc.

Patent Owner: Intellectual Property Ventures I, LLC

Inter Partes Review Certificate for:
  Patent No.: 5,779,334
  Issued: Jul. 14, 1998
  Appl. No.: 08/780,351
  Filed: Jan. 8, 1997

The results of IPR2013-00112 are reflected in this inter partes review certificate under 35 U.S.C. 318(b).

INTER PARTES REVIEW CERTIFICATE
U.S. Patent 5,779,334 K1
Trial No. IPR2013-00112
Certificate Issued Dec. 17, 2014

AS A RESULT OF THE INTER PARTES REVIEW PROCEEDING, IT HAS BEEN DETERMINED THAT:

Claims 1-6 and 11-14 are cancelled.

* * * * *